US012251824B2

United States Patent
Hsu et al.

(10) Patent No.: US 12,251,824 B2
(45) Date of Patent: Mar. 18, 2025

(54) ROBOT ARM JOINT, CONNECTOR AND ROBOT ARM

(71) Applicant: CHIEFTEK PRECISION CO., LTD., Tainan (TW)

(72) Inventors: Ming-Che Hsu, Tainan (TW); Syuan-Jyun Wu, Tainan (TW)

(73) Assignee: Chieftek Precision Co., Ltd., Tainan (TW)

( * ) Notice: Subject to any disclaimer, the term of this patent is extended or adjusted under 35 U.S.C. 154(b) by 0 days.

(21) Appl. No.: 18/299,966

(22) Filed: Apr. 13, 2023

(65) Prior Publication Data

US 2023/0390948 A1 Dec. 7, 2023

(30) Foreign Application Priority Data

Jun. 2, 2022 (TW) .................................. 111120688

(51) Int. Cl.
  *B25J 17/02* (2006.01)
  *B25J 9/00* (2006.01)
  *B25J 9/06* (2006.01)
  *B25J 18/00* (2006.01)

(52) U.S. Cl.
  CPC ............. *B25J 17/02* (2013.01); *B25J 9/0009* (2013.01); *B25J 9/06* (2013.01); *B25J 18/00* (2013.01)

(58) Field of Classification Search
  CPC ...... B25J 17/0241; B25J 9/08; B25J 19/0041; B25J 19/033; B25J 19/0029; B25J 19/0025
  See application file for complete search history.

(56) References Cited

U.S. PATENT DOCUMENTS

| 7,206,666 | B2 | 4/2007 | Ito | |
| 10,762,801 | B2 * | 9/2020 | Ciniello | B25J 9/08 |
| 11,167,411 | B2 * | 11/2021 | Toothaker | B25J 15/0491 |
| 11,224,978 | B2 * | 1/2022 | Ayuzawa | B25J 19/0029 |
| 11,901,668 | B2 * | 2/2024 | He | B25J 13/087 |
| 2021/0370498 | A1 * | 12/2021 | Kudo | B25J 15/045 |
| 2022/0118634 | A1 | 4/2022 | Pfister et al. | |
| 2022/0134539 | A1 | 5/2022 | Kastler et al. | |
| 2022/0134540 | A1 | 5/2022 | Kastler et al. | |
| 2022/0143815 | A1 | 5/2022 | Kastler et al. | |
| 2023/0082028 | A1 * | 3/2023 | Kastler | B25J 9/0048 74/490.05 |

FOREIGN PATENT DOCUMENTS

| CN | 110733030 A | 1/2020 | |
| CN | 114188900 A | 3/2022 | |
| WO | WO-2021250075 A1 * | 12/2021 | B25J 13/08 |

OTHER PUBLICATIONS

Search Report mailed to Corresponding European Patent Application No. 23176533.8-1002 on Oct. 17, 2023.

* cited by examiner

*Primary Examiner* — Gregory Robert Weber
(74) *Attorney, Agent, or Firm* — Rosenberg, Klein & Lee

(57) ABSTRACT

A robot arm joint, a connector and a robot arm are disclosed. The robot arm joint has a joint body and a joint wire assembly. The joint body includes a fixing end and a transmission end. The joint wire assembly is arranged in the joint body and extends on a preset connection path. The preset connection path includes a straight path. The joint wire assembly includes a torsion section connected to the transmission end and a fixed section connected to the fixing end. When the transmission end rotates, the torsion section is simultaneously driven to twist on the straight path.

17 Claims, 14 Drawing Sheets

ROBOT ARM JOINT, CONNECTOR AND ROBOT ARM

FIELD OF THE INVENTION

The present invention relates to a robot arm joint, a connector and a robot arm. In particular, the wires used for transmitting power and signals of the robot arm are disposed inside the robot arm joint and the connector, and the power contacts and the signal contacts are connected in series on the ends of the robot arm joint and the connector.

BACKGROUND OF THE INVENTION

A robot arm is formed by connecting a plurality of joints, such as a six-axis robot arm. The joints of the robot arm are connected in series through power cables and signal cables, so that each axis of the robot arm can be driven by electricity and complete predetermined actions in sequence according to input signals.

As disclosed in U.S. Patent Application Early Publication No. US20210370498A titled "Assembly for a Robot, and Robot Device", the connection between two adjacent joints of the robot arm includes the following features:

(1) The first circuit board 11 and the second circuit board 12 directly serve as coupling planes. But, this feature causes the problem of insufficient strength. In the assembly process, if the first circuit board 11 and the second circuit board 12 are collided by a relatively large external force, they will be damaged easily.

(2) The power supply terminal 31 of the first circuit board 11 is in the form of a recess. The power supply terminal 34 of the second circuit board 12 is in the form of a protruding plate. In this feature, the protruding power supply terminal 34 is easily bent or damaged due to contact with foreign objects or positional errors when it is coupled. The coupling cannot be performed correctly to transmit power. When the protruding power supply terminal 34 is inserted into the recessed power supply terminal 31, the recessed power supply terminal 31 does not completely cover the protruding power supply terminal 34, resulting in a limited contact area. The current is small and prone to overheating due to high resistance. Thus, the current at the same voltage is smaller and prone to overheating due to high resistance.

(3) The signal terminal 32 of the first circuit board 11 is in the form of a contact, and the signal terminal 35 of the second circuit board 12 is in the form of a spring. In this feature, the signal terminal 35 in the form of a spring is easily deflected due to contact with foreign objects, and cannot be coupled correctly for transmitting signals. Or, the signal transmission using contacts has the problem of weak signal strength.

As disclosed in U.S. Patent Publication No. U.S. Pat. No. 7,206,666 titled "Actuator Unit and Multi-axis Robot", the connection of two adjacent joints of the robot arm includes the following features. As disclosed in the paragraph [0092] of the description of this patent, referring to FIG. 5 of this patent, the wire harness 57 extending from the electrical contact 56 winds several turns around the output shaft 55, and then is connected to the control board 40 in the actuator unit. Similarly, the wire harness (not shown) extending from the electrical contact 46 winds several turns around the output shaft 45, and then is connected to the control board 40 in the actuator unit. As disclosed in the paragraph [0093] of the description of this patent, the wire harness 57 winds several turns around the output shaft 55 connected to the motor to prevent the wire harness 57 from being cut in the range of rotation (about −180 degrees to about +180 degrees) of the output shaft 55. Furthermore, this winding structure suppresses metal fatigue of the wire harness 57 even if the output shaft 55 rotates many times. That is to say, the invention disclosed in U.S. Patent Publication U.S. Pat. No. 7,206,666 utilizes the feature that "the wire harness 57 winds several turns around the output shaft 55" to avoid metal fatigue of the wire harness 57. However, such a feature still has the following defects:

(1) When the output shaft 55 rotates, the wire harness 57 is pulled or loosened along the helical path of the output shaft 55. In order to keep the tolerance for the movement of the wire harness 57 when the wire harness 57 is pulled, the wire harness 57 must be wound on the output shaft 55 loosely. Besides, it is necessary to use a longer wire harness 57 to wind several turns around the output shaft 55 for the rotation of the output shaft 55.

(2) For a miniature or small robot arm, the space in the joint of the robot arm is less, and components in the joint of the robotic arm are in close proximity to each other. The way that "the wire harness 57 winds several turns around the output shaft 55" is not suitable for miniature or small-sized robotic arms.

(3) Referring to FIG. 10, as to the way that "the wire harness 57 winds several turns around the output shaft 55", a winding radius R is formed between the wire harness 57 and the rotation axis of the output shaft 55. Because the output shaft 55 rotates frequently, the wire harness 57 is in a state of frequent pulling and loosening. Because the distance of the winding radius R is quite large, even if the wire harness 57 winds several turns around the output shaft 55, the metal of the wire harness 57 is easily fatigued.

SUMMARY OF THE INVENTION

According to one aspect of the present invention, a robot arm joint is provided. The robot arm joint comprises a joint body, a motor, a fixing end modular contact seat, a transmission end modular contact seat, and a joint wire assembly. The joint body includes a fixing end and a transmission end. The fixing end has a fixing end connecting surface. The transmission end has a transmission end connecting surface. The motor is fixed in the joint body and configured to output power to the transmission end. The fixing end modular contact seat is fixed to the fixing end connecting surface. The fixing end modular contact seat includes a plurality of fixing end power contacts and a plurality of fixing end signal contacts. The fixing end power contacts and the fixing end signal contacts are exposed on the fixing end connecting surface. The transmission end modular contact seat is fixed to the transmission end connecting surface. The transmission end modular contact seat includes a plurality of transmission end power contacts and a plurality of transmission end signal contacts. The transmission end power contacts and the transmission end signal contacts are exposed on the transmission end connecting surface. The joint wire assembly is disposed in the joint body. The joint wire assembly includes a plurality of joint wires. The plurality of joint wires extends on a preset connection path. The preset connection path includes a straight path. The joint wire assembly includes a torsion section and a fixed section. One end of the torsion section is connected to the transmission end modular contact seat. One end of the fixed section is connected to the fixing end modular contact seat. When the transmission end rotates, the torsion section is simultaneously driven to twist on the straight path.

Preferably, the transmission end includes a transmission member. The motor is connected to the transmission member through a transmission assembly. The transmission member is rotatable relative to the joint body. The transmission end connecting surface is located on the transmission member. The transmission end connecting surface is exposed on the joint body.

Preferably, the fixing end power contacts and the fixing end signal contacts are in the form of a plug pin. The transmission end power contacts and the transmission end signal contacts are in the form of a socket. The socket has an annular inner surface matched with the plug pin.

Preferably, opposite two ends of the straight path have two retaining members. The torsion section of the joint wire assembly is located between the two retaining members.

Preferably, a slip ring is provided in the joint body. The slip ring connects the torsion section and the fixed section, so that the torsion section is able to rotate relative to the fixed section.

Preferably, the transmission end rotates about a rotation axis. The transmission end has a wire hole along the rotation axis. The straight path is arranged on the rotation axis. The joint wire assembly passes through the wire hole and is connected to the transmission end modular contact seat.

Preferably, the robot arm joint further comprises an encoder and a driver. The motor is electrically connected to the encoder and the driver. The motor, the encoder and the driver are arranged on the rotation axis sequentially in a direction opposite to the transmission end. The straight path passes through the motor and the encoder.

Preferably, the fixing end has a fixing end coupling unit. The transmission end has a transmission end coupling unit. The fixing end and the transmission end each have a fool-proof unit.

According to another aspect of the present invention, a connector for connecting the foregoing robot arm joint. The connector comprises a connector body and a connector wire assembly. The connector body includes a first end and a second end. The first end has a first end connecting surface and a first end modular contact seat fixed to the first end connecting surface. The first end modular contact seat includes a first end power contact and a first end signal contact that are exposed on the first end connecting surface. The second end has a second end connecting surface and a second end modular contact seat fixed to the second end connecting surface. The second end modular contact seat includes a second end power contact and a second end signal contact that are exposed on the second end connecting surface. The connector wire assembly is disposed in the connector body. The connector wire assembly includes a plurality of connector wires. One end of the connector wire assembly is connected to the first end modular contact seat. Another end of the connector wire assembly is connected to the second end modular contact seat.

Preferably, the first end power contact and the first end signal contact of the first end modular contact seat are in the form of a socket, and the socket has an annular inner surface. The second end power contact and the second end signal contact of the second end modular contact seat are in the form of a socket, and the socket has an annular inner surface.

Preferably, the first end power contact and the first end signal contact of the first end modular contact seat are in the form of a plug pin. The second end power contact and the second end signal contact of the second end modular contact seat are in the form of a socket, and the socket has an annular inner surface.

Preferably, the first end has a first end coupling unit, and the second end has a second end coupling unit.

According to a further aspect of the present invention, a robot arm is provided. The robot arm comprises the foregoing robot arm joint and the foregoing connector that are connected to each other.

The fixing end of the joint body has any of the following connection relationships:
- the fixing end is connected to the first end, the fixing end power contacts and the fixing end signal contacts are connected to the first end power contact and the first end signal contact, respectively;
- the fixing end is connected to the second end, the fixing end power contacts and the fixing end signal contacts are connected to the second end power contact and the second end signal contact, respectively; or
- the fixing end is connected to the transmission end of another joint body, the fixing end power contacts and the fixing end signal contacts are connected to the transmission end power contacts and the transmission end signal contacts of the another joint body, respectively.

The transmission end of the joint body has any of the following connection relationships:
- the transmission end is connected to the first end, the transmission end power contacts and the transmission end signal contacts are connected to the first end power contact and the first end signal contact, respectively;
- the transmission end is connected to the second end, the transmission end power contacts and the transmission end signal contacts are connected to the second end power contact and the second end signal contact, respectively; or
- the transmission end is connected to the fixing end of another joint body, the transmission end power contacts and the transmission end signal contacts are connected to the fixing end power contacts and the fixing end signal contacts of the another joint body, respectively.

The joint wire assembly and the connector wire assembly are connected in series with each other by means of the connection relationships.

Preferably, the connection relationship of the contacts is that a plug pin is inserted into a socket, and the socket has an annular inner surface matched with the plug pin.

According to the above-mentioned technical features, the following effects can be achieved:
1. The joint wire assembly is connected to the transmission end along a straight path. When the transmission end rotates, the joint wire assembly is in the state of "twisting on the straight path". Therefore, the joint wire assembly has minimal deformation, thereby supporting the transmission end to perform forward rotation or reverse rotation at a large angle. The joint wire assembly has a longer service life. Because the joint wire assembly only twists on the preset connection path (especially the straight path on the rotation axis), there is no continuous winding and unwinding of the wires around the shaft. It is not easy to have metal fatigue problems.
2. The joint wire assembly at the transmission end is arranged along a straight path, instead of the helical winding assembly. There is no need to reserve much space inside the robot arm joint for the helical winding deformation of the joint wire assembly during work.

Therefore, it is particularly suitable for small robotic arms or micro robotic arms with limited space inside the joint. Compared with the prior art, the torsional radius r of the torsion section of the joint wire assembly is much smaller than the winding radius R of the wire harness as disclosed in U.S. Pat. No. 7,206,666 (r<R). Therefore, it is applicable to the smaller joint body.

3. After the robotic arm joint and the connector of the present invention are assembled, the power contacts and the signal contacts are automatically connected, so that the power and signals can be transmitted to the joint of each axis of the robotic arm to drive the robotic arm smoothly.

4. The joint wire assembly inside the robot arm joint is retained by the two retaining members, which can ensure that the joins at both ends of the joint wire assembly will not suffer from poor contact or breakage due to stress when the transmission end rotates. The joint wire assembly is divided into a torsion section and a fixed section. The torsion section is essentially arranged along the straight path, providing a larger range of torsion space and torsion margin for the joint wire assembly, and allowing the torsion section to be twisted clockwise/counterclockwise frequently.

5. Further, a slip ring is provided to connect the torsion section and the fixed section of the joint wire assembly, so that the transmission end can rotate without restriction. The rotation of the joint wire assembly will be done in the slip ring, without causing a twist of the joint wire assembly.

6. All the wire assemblies are hidden inside the robot arm and not exposed. During the movement of the robot arm, the robot arm will not be hindered by the exposed wire assemblies.

7. When the robot arm joint and the connector of the present invention are assembled, the fixing end and the transmission end of the joint body have the fixing end connecting surface and the transmission end connecting surface to serve as the coupling planes. The first end and the second end of the connector have the first end connecting surface and the second end connecting surface to serve as the coupling planes. For example, the coupling planes are made of the same rigid metal material as the joint body and the connector body, instead of using a circuit board (PCB board) for coupling, thereby having higher structural strength.

8. When the robot arm joint and the connector of the present invention are assembled, the power contacts and the signal contacts are not in the form of a protruding plate and a recess, nor in the form of a contact and a spring. Thus, they will not be bent and damaged due to collision.

9. When the robot arm joint and the connector of the present invention are assembled, the connection relationship of the contacts is that a plug pin is inserted into a socket, and the socket has an annular inner surface to match and cover the plug pin. Therefore, the contacts have the largest contact area. When used to transmit signals, they have greater signal strength. When used to transmit current, they have less resistance to avoid overheating.

DESCRIPTION OF THE PREFERRED EMBODIMENTS

Embodiments of the present invention will now be described, by way of example only, with reference to the accompanying drawings.

Figure 1:
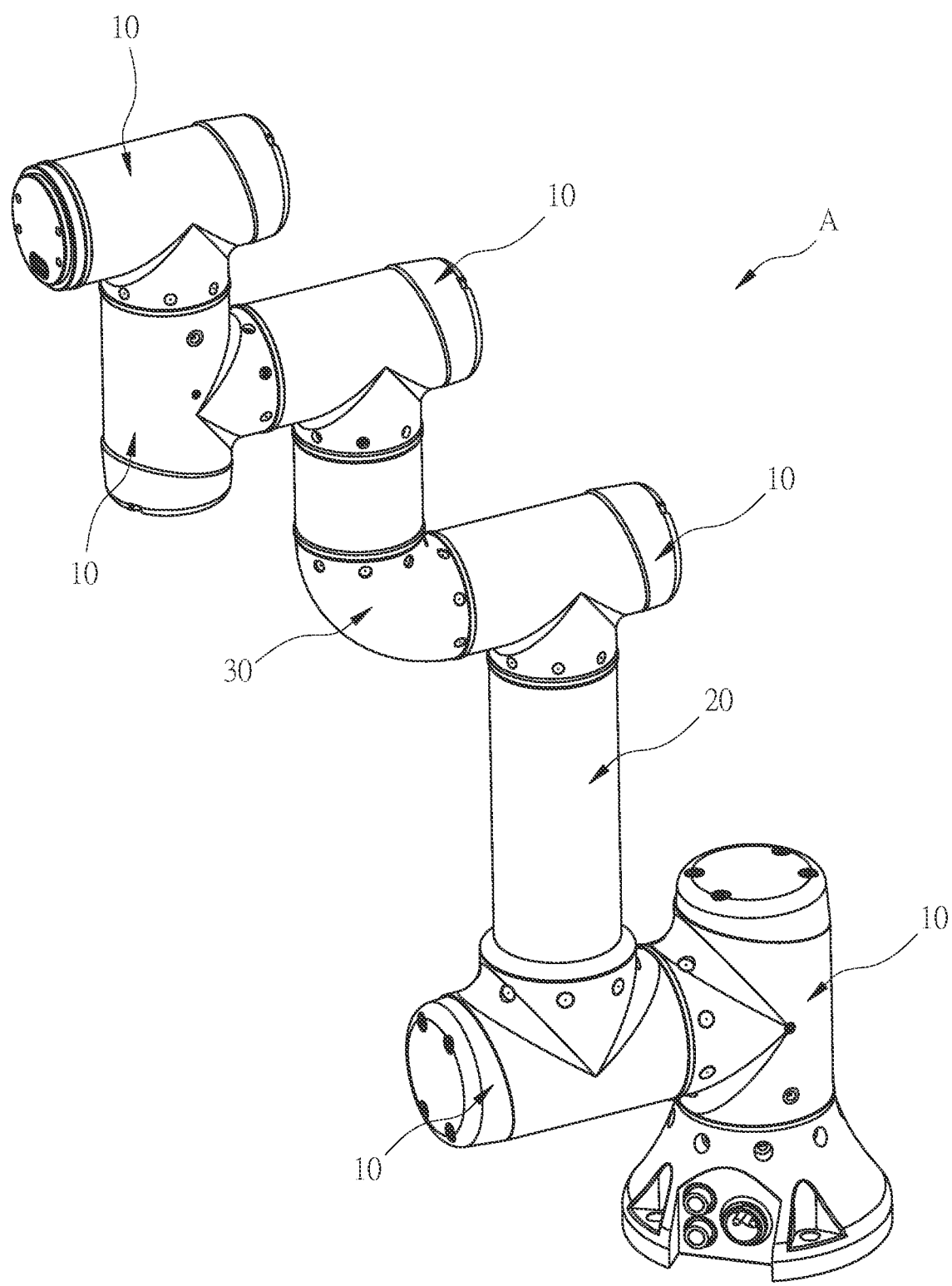
FIG. 1 is a perspective view of the robot arm of the present invention.
Figure 2:
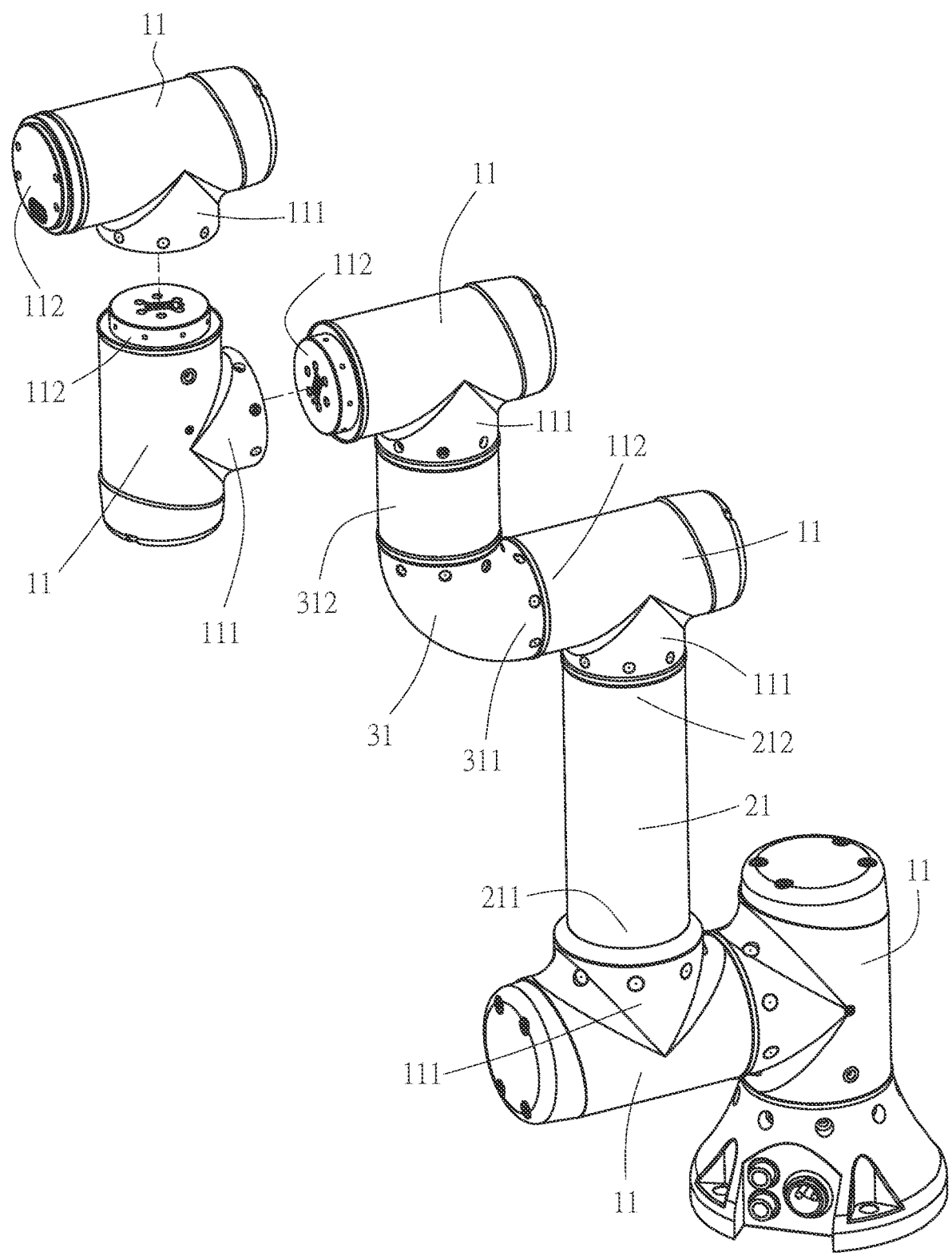
FIG. 2 is a partial exploded view of the robot arm of the present invention.
Figure 3:
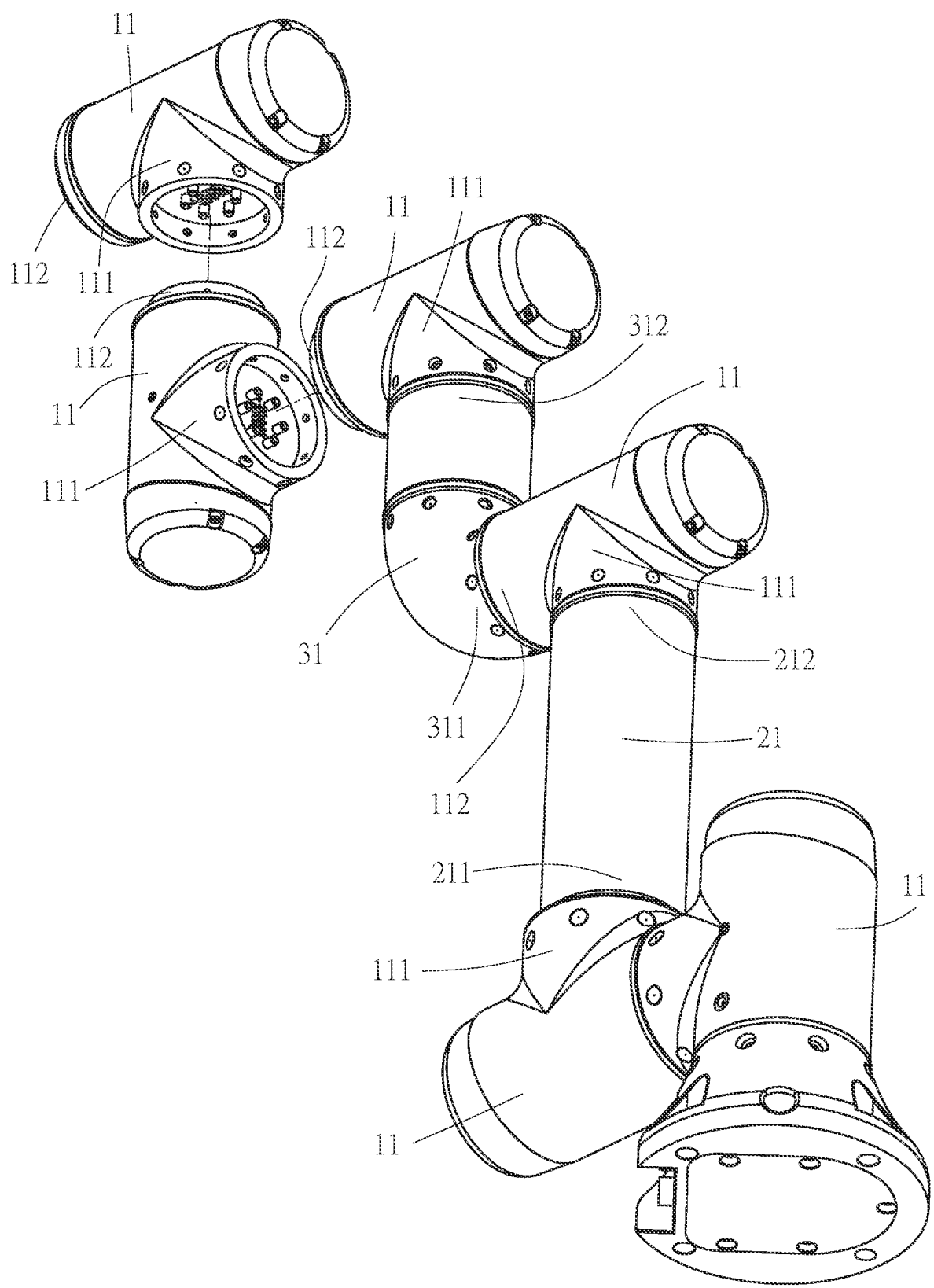
FIG. 3 is another partial exploded view of the robot arm of the present invention.

As shown in FIG. 1 through FIG. 3, a robot arm A according to an embodiment of the present invention is a six-axis robot arm, comprising six robot arm joints 10 and two connectors. The two connectors are defined as a first connector 20 and a second connector 30. The structures of the first connector 20 and the second connector 30 are the same, but they have different shapes for constructing the six-axis robot arm of this embodiment. The robot arm joint 10 includes a joint body 11. The joint body 11 includes a fixing end 111 and a transmission end 112. The first connector 20 includes a first connector body 21. The first connector body 21 includes a first end 211 and a second end 212. The second connector 30 includes a second connector body 31. The second connector body 31 also includes a first end 311 and a second end 312.

The assembly method of the robot arm joints 10 and the connectors in this embodiment includes: for two adjacent joint bodies 11, the fixing end 111 of one joint body 11 is connected to the transmission end 112 of the other joint body 11; for adjacent joint bodies 11 and the first connector body 21, the first end 211 and the second end 212 of the first connector body 21 are connected to the fixing ends 111 of the adjacent joint bodies 11, respectively; for adjacent joint bodies 11 and the second connector body 31, the first end 311 of the second connector body 31 is connected to the transmission end 112 of one adjacent joint body 11, and the second end 312 of the second connector body 31 is connected to the fixing end 111 of the other adjacent joint body 11.

Figure 4:
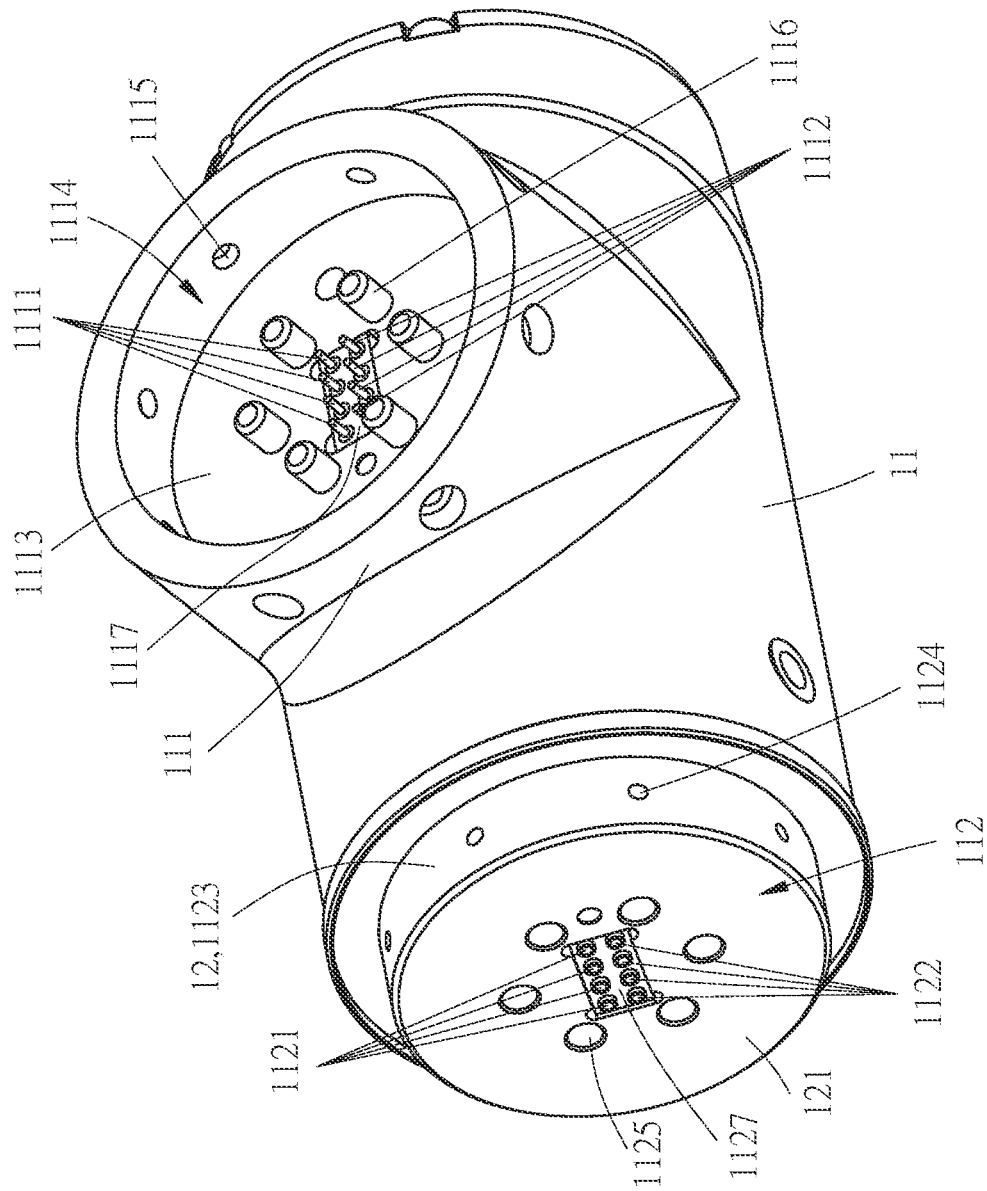
FIG. 4 is a perspective view of the robot arm joint of the robot arm of the present invention.
Figure 5:
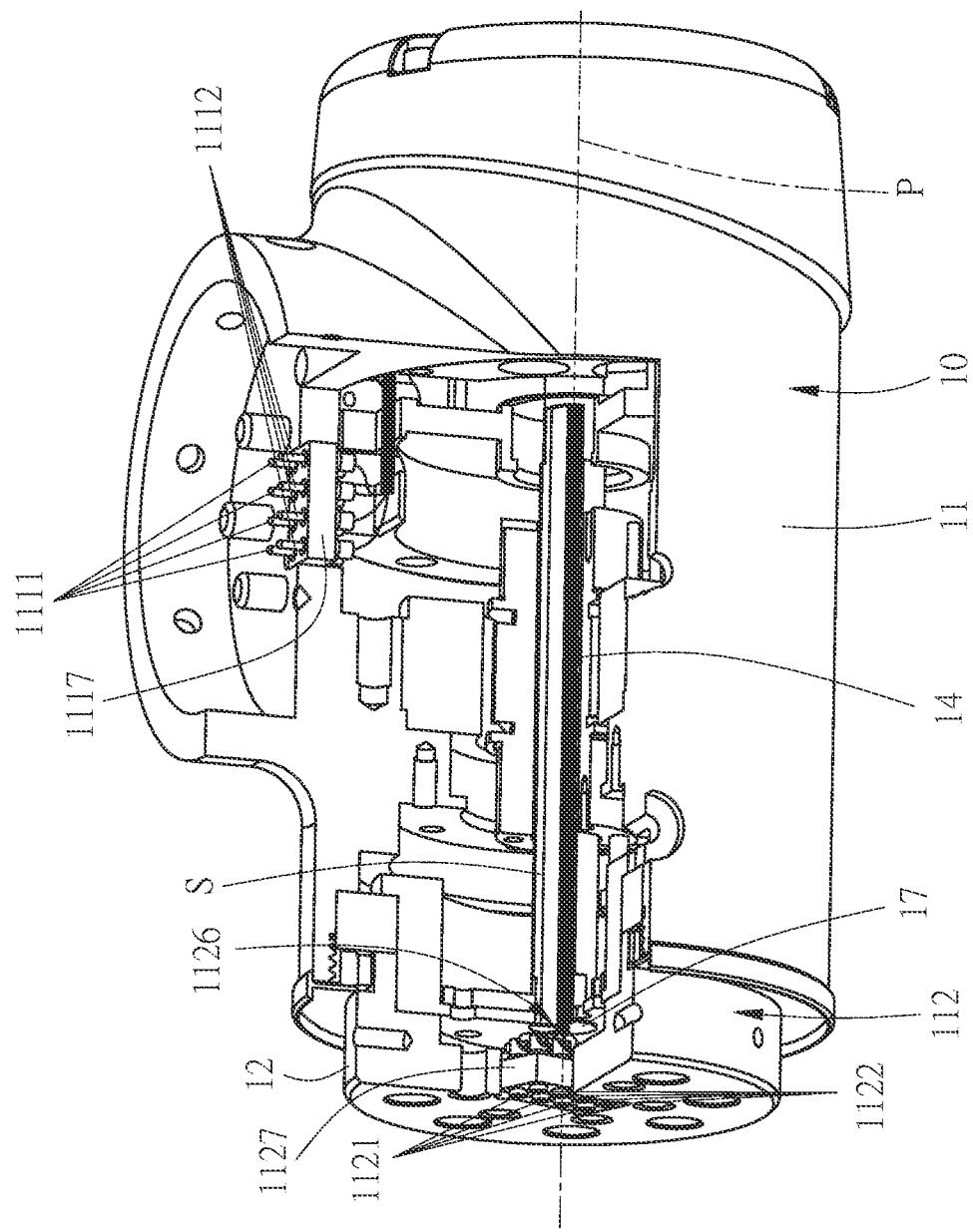
FIG. 5 is a perspective and partial sectional view of FIG. 4.
Figure 5A:
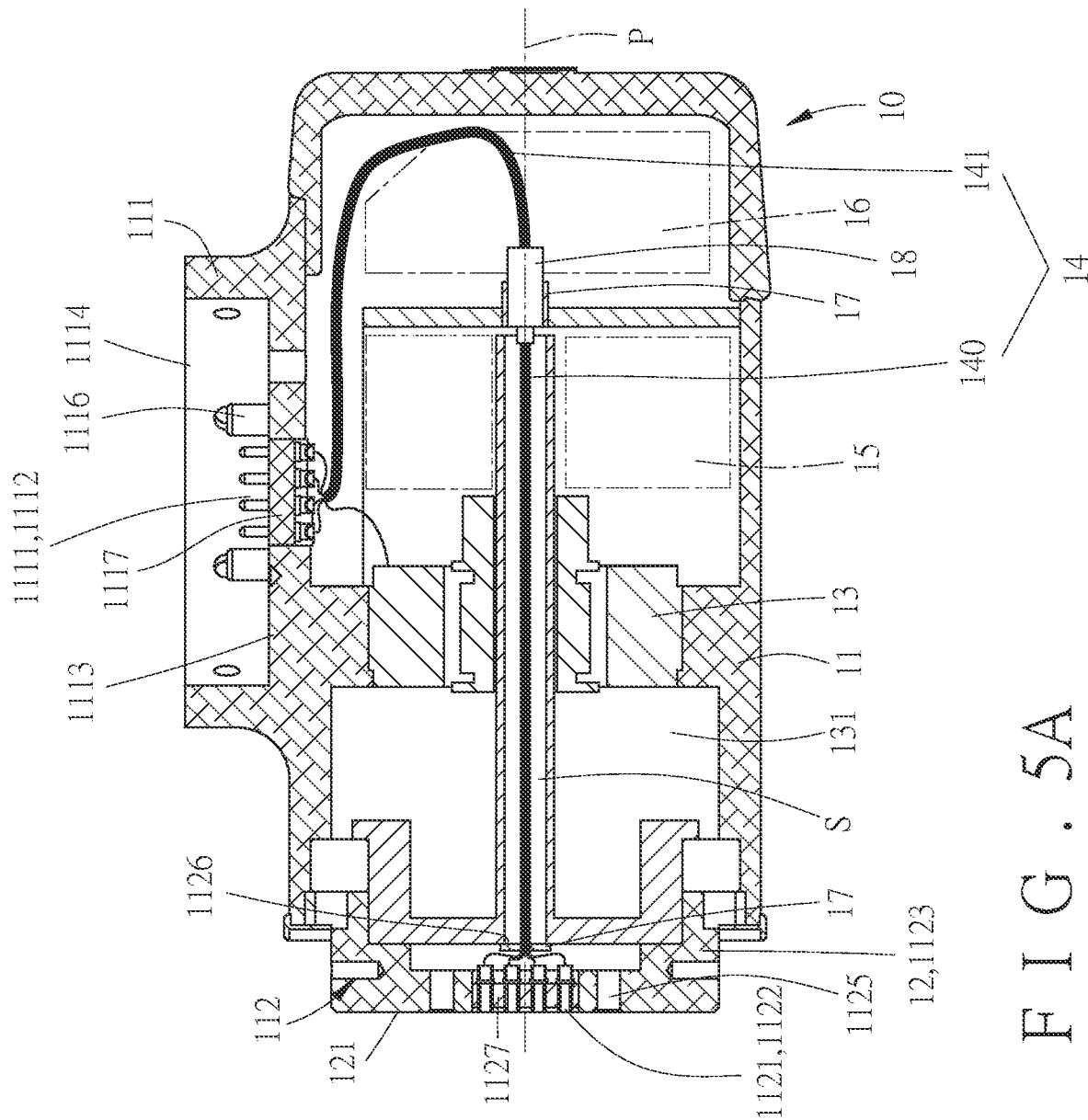
FIG. 5A is a cross-sectional view of FIG. 4, wherein the drawing is presented in a simplified form.

Referring to FIG. 4, FIG. 5 and FIG. 5A, the fixing end 111 of the joint body 11 has a fixing end power contact 1111 and a fixing end signal contact 1112. Specifically, the fixing end power contact 1111 and the fixing end signal contact 1112 are integrated on a fixing end modular contact seat 1117. The transmission end 112 of the joint body 11 has a transmission end power contact 1121 and a transmission end signal contact 1122. Specifically, the transmission end power contact 1121 and the transmission end signal contact 1122 are integrated on a transmission end modular contact seat 1127. The transmission end 112 includes a transmission member 12. The transmission member 12 includes a transmission end connecting surface 121. The transmission end connecting surface 121 is exposed on the joint body 11. The transmission end modular contact seat 1127 is fixed to the transmission end connecting surface 121. The transmission end power contact 1121 and the transmission end signal contact 1122 are exposed on the transmission end connecting surface 121. The fixing end 111 has a fixing end connecting surface 1113. The fixing end modular contact seat 1117 is fixed to the fixing end connecting surface 1113. The fixing end power contact 1111 and the fixing end signal contact 1112 are exposed on the fixing end connecting surface 1113. In this embodiment, the fixing end 111 further has a fixing end coupling unit 1114. The transmission end 112 has a transmission end coupling unit 1123. The fixing end 111 and the transmission end 112 each have a fool-proof unit. Specifically, the fixing end coupling unit 1114 is a recess portion. The transmission end coupling unit 1123 is a protruding portion formed by the transmission member 12 protruding from the joint body 11. The periphery of the fixing end coupling unit 1114 and the periphery the transmission end coupling unit 1123 have a plurality of pin holes 1115/1124, respectively. The fool-proof unit of the fixing end 111 is a post 1116. The fool-proof unit of the transmission end 112 is a groove 1125. The fool-proof unit is configured to prevent the fixing ends 111 of the adjacent joint bodies 11 from touching and to prevent the transmission ends 112 of the adjacent joint bodies 11 from touching.

The robot arm joint 10 further includes a motor 13, a joint wire assembly 14, an encoder 15, and a driver 16. The motor 13, the encoder 15 and the driver 16 are electrically connected to each other. The motor 13 is fixed in the joint body 11 and connected to the transmission member 12 through a transmission assembly 131. Thus, the motor 13 can output power to the transmission end 112, so that the transmission member 12 can rotate relative to the joint body 11. The joint wire assembly 14 is disposed in the joint body 11. The joint wire assembly 14 includes a plurality of joint wires. One end of the joint wire assembly 14 is connected to the fixing end modular contact seat 1117, and the other end of the joint wire assembly 14 is connected to the transmission end modular contact seat 1127. The joint wires of the joint wire assembly 14 extend on a preset connection path. Preferably, the preset connection path includes a straight path S. Specifically, in this embodiment, the transmission member 12 of the transmission end 112 rotates about a rotation axis P. The transmission end 112 has a wire hole 1126 along the rotation axis P. The straight path S is arranged on the rotation axis P. The joint wire assembly 14 passes through the wire hole 1126 and is connected to the transmission end modular contact seat 1127. The transmission assembly 131, the motor 13, the encoder 15 and the driver 16 are arranged on the rotation axis P sequentially in a direction opposite to the transmission end 112. The straight path S passes through the transmission assembly 131, the motor 13 and the encoder 15. Further, opposite two ends of the straight path S have two retaining members 17 for retaining the joint wire assembly 14. The joint wire assembly passes through the two retaining member 17 to form a torsion section 140 and a fixed section 141. The torsion section 140 is located between the two retaining members 17. The torsion section 140 is substantially arranged along the straight path S. One end of the torsion section 140 is connected to the transmission end modular contact seat 1127. The fixed section 141 is located between the retaining member 17 away from the transmission end 112 and the fixing end 111. One end of the fixed section 141 is connected to the fixing end modular contact seat 1117. The fixed section 141 is unable to move or twist inside the joint body 11. Preferably, a slip ring 18 is provided in the joint body 11. The slip ring 18 connects the torsion section 140 and the fixed section 141. The slip ring 18 allows transmission of power and signals in a rotating state.

Figure 6:
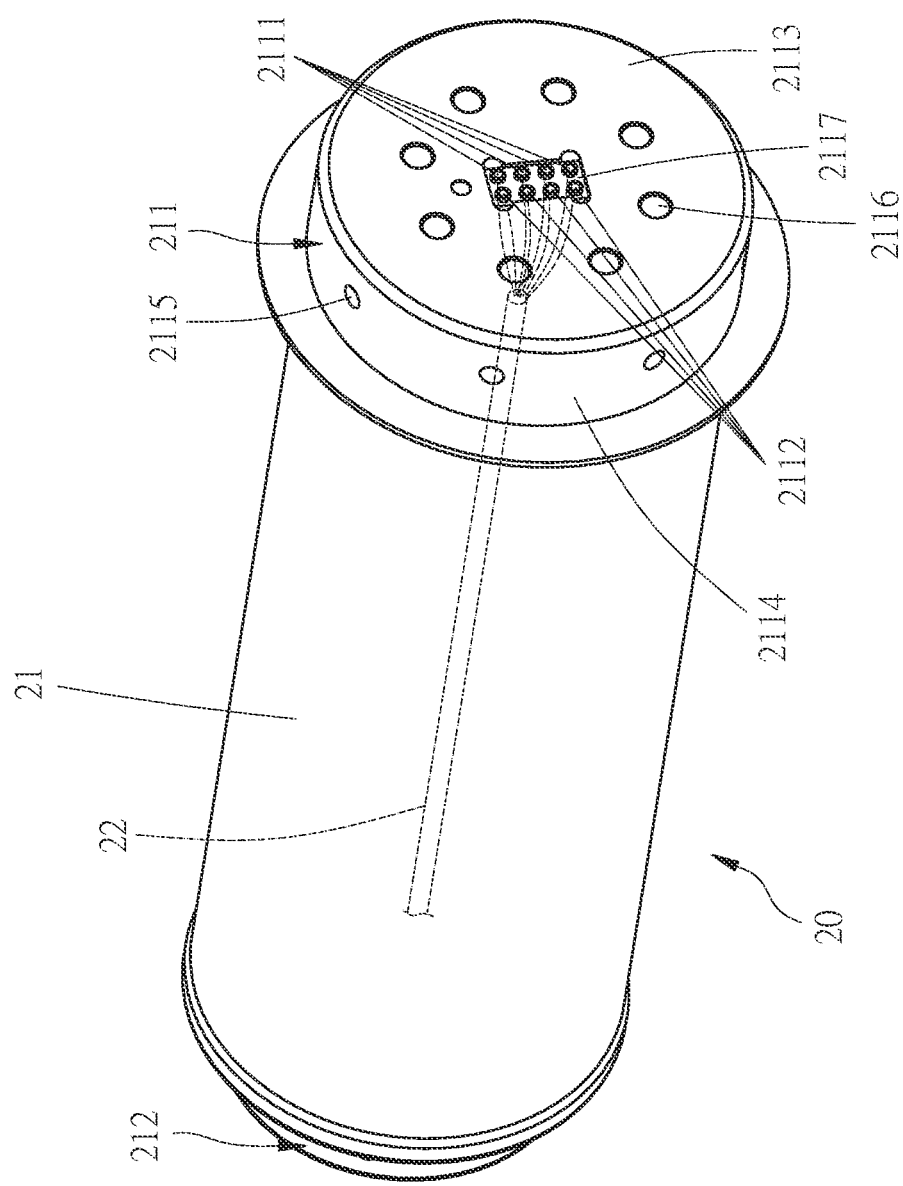
FIG. 6 is a perspective view of the first connector of the robot arm of the present invention.
Figure 6A:
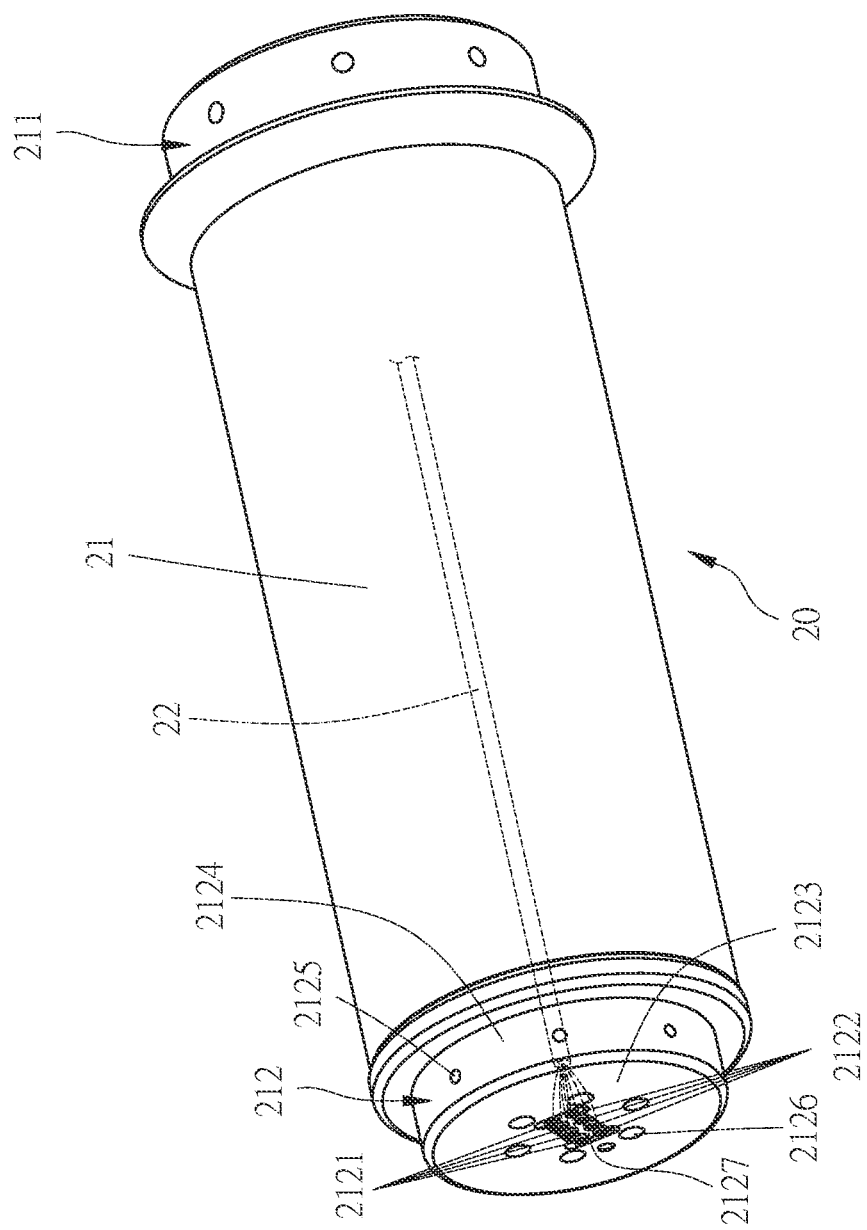
FIG. 6A is another perspective view of the first connector of the robot arm of the present invention.

Referring to FIG. 6 and FIG. 6A, the first end 211 of the first connector body 21 has a first end power contact 2111 and a first end signal contact 2112. Specifically, the first end power contact 2111 and the first end signal contact 2112 are integrated on a first end modular contact seat 2117. The second end 212 of the first connector body 21 has a second end power contact 2121 and a second end signal contact 2122. Specifically, the second end power contact 2121 and the second end signal contact 2122 are integrated on a second end modular contact seat 2127. The first end 211 has a first end connecting surface 2113. The first end modular contact seat 2117 is fixed to the first end connecting surface 2113. The first end power contact 2111 and the first end signal contact 2112 are exposed on the first end connecting surface 2113. The second end 212 has a second end connecting surface 2123. The second end modular contact seat 2127 is fixed to the second end connecting surface 2123. The second end power contact 2121 and the second end signal contact 2122 are exposed on the second end connecting surface 2123. In this embodiment, the first end 211 further has a first end coupling unit 2114, and the second end 212 further has a second end coupling unit 2124. Specifically, the first end coupling unit 2114 and the second end coupling unit 2124 are each a protruding portion. The periphery of the first end coupling unit 2114 and the periphery the second end coupling unit 2124 have a plurality of pin holes 2115/2125, respectively. The first end 211 and the second end 212 have a plurality of grooves 2116/2126 corresponding to the fool-proof unit (the post 1116) of the fixing end 111 of the joint body 11.

The first connector 20 further includes a first connector wire assembly 22. The first connector wire assembly 22 is disposed in the first connector body 21. The first connector wire assembly 22 includes a plurality of connector wires. One end of the first connector wire assembly 22 is connected to the first end modular contact seat 2117, and the other end of the first connector wire assembly 22 is connected to the second end modular contact seat 2127.

Figure 6B:
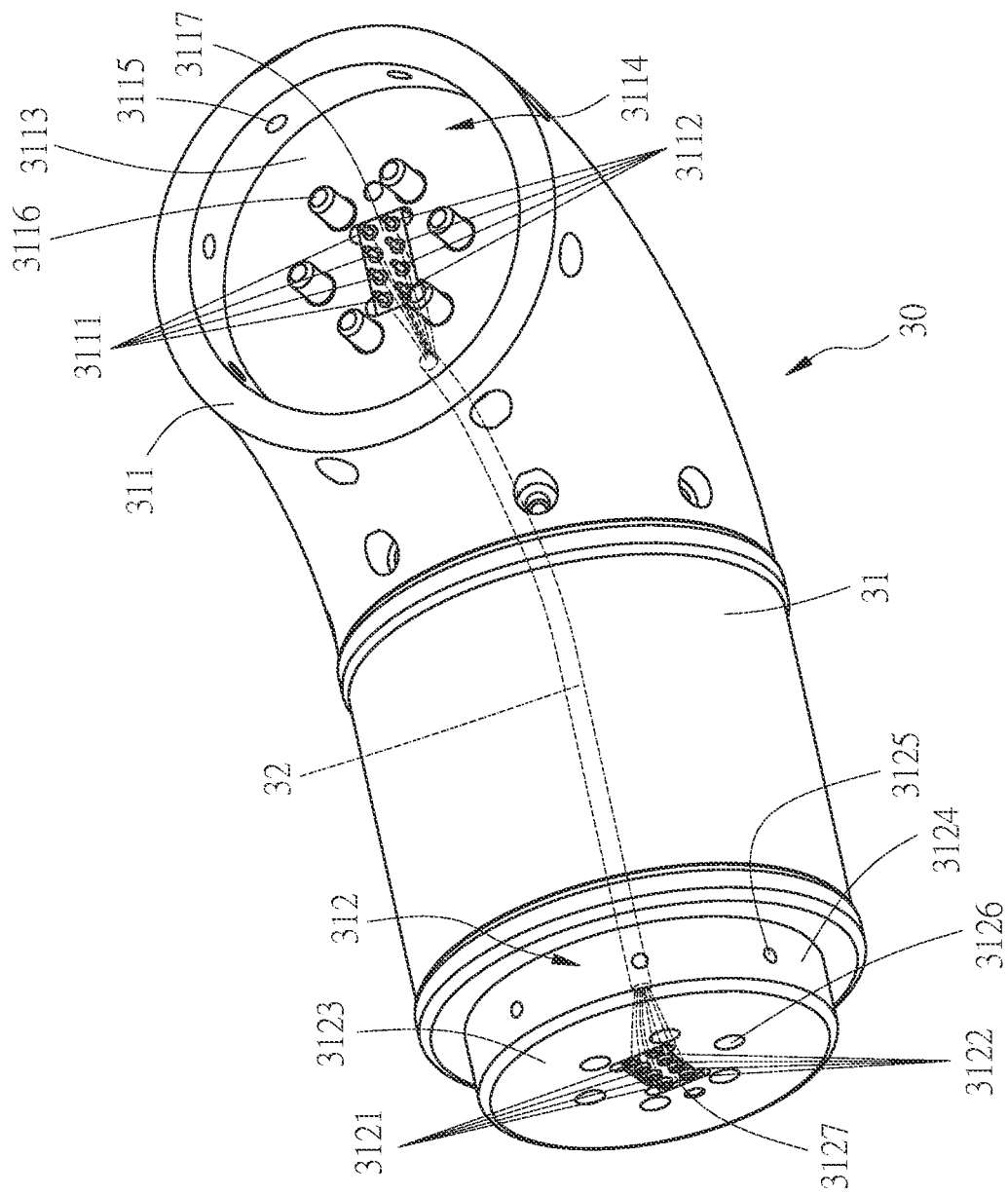
FIG. 6B is a perspective view of the second connector of the robot arm of the present invention.

Referring to FIG. 6B, the first end 311 of the second connector body 31 has a first end power contact 3111 and a first end signal contact 3112. Specifically, the first end power contact 3111 and the first end signal contact 3112 are integrated on a first end modular contact seat 3117. The second end 312 of the second connector body 31 has a second end power contact 3121 and a second end signal contact 3122. Specifically, the second end power contact 3121 and the second end signal contact 3122 are integrated on a second end modular contact seat 3127. The first end 311 has a first end connecting surface 3113. The first end modular contact seat 3117 is fixed to the first end connecting surface 3113. The first end power contact 3111 and the first end signal contact 3112 are exposed on the first end connecting surface 3113. The second end 312 has a second end connecting surface 3123. The second end modular contact seat 3127 is fixed to the second end connecting surface 3123. The second end power contact 3121 and the second end signal contact 3122 are exposed on the second end connection surface 3123. In this embodiment, the first end 311 further has a first end coupling unit 3114, and the second end 312 further has a second end coupling unit 3124. Specifically, the first coupling unit 3114 is a recess portion, and the second coupling unit 3124 is a protruding portion. The periphery of the first end coupling unit 3114 and the periphery the second end coupling unit 3124 have a plurality of pin holes 3115/3125, respectively. The first end 311 has a plurality of posts 3116 corresponding to the fool-proof unit (the groove 1125) of the transmission end 112 of the joint body 11. The second end 312 has a plurality of grooves 3126 corresponding to the fool-proof unit (the post 1116) of the fixing end 111 of the joint body 11.

The second connector 30 further includes a second connector wire assembly 32. The second connector wire assembly 32 is disposed in the second connector body 31. The second connector wire assembly 32 includes a plurality of connector wires. One end of the second connector wire assembly 32 is connected to the first end modular contact seat 3117, and the other end of the second connector wire assembly 32 is connected to the second end modular contact seat 3127.

Figure 7:
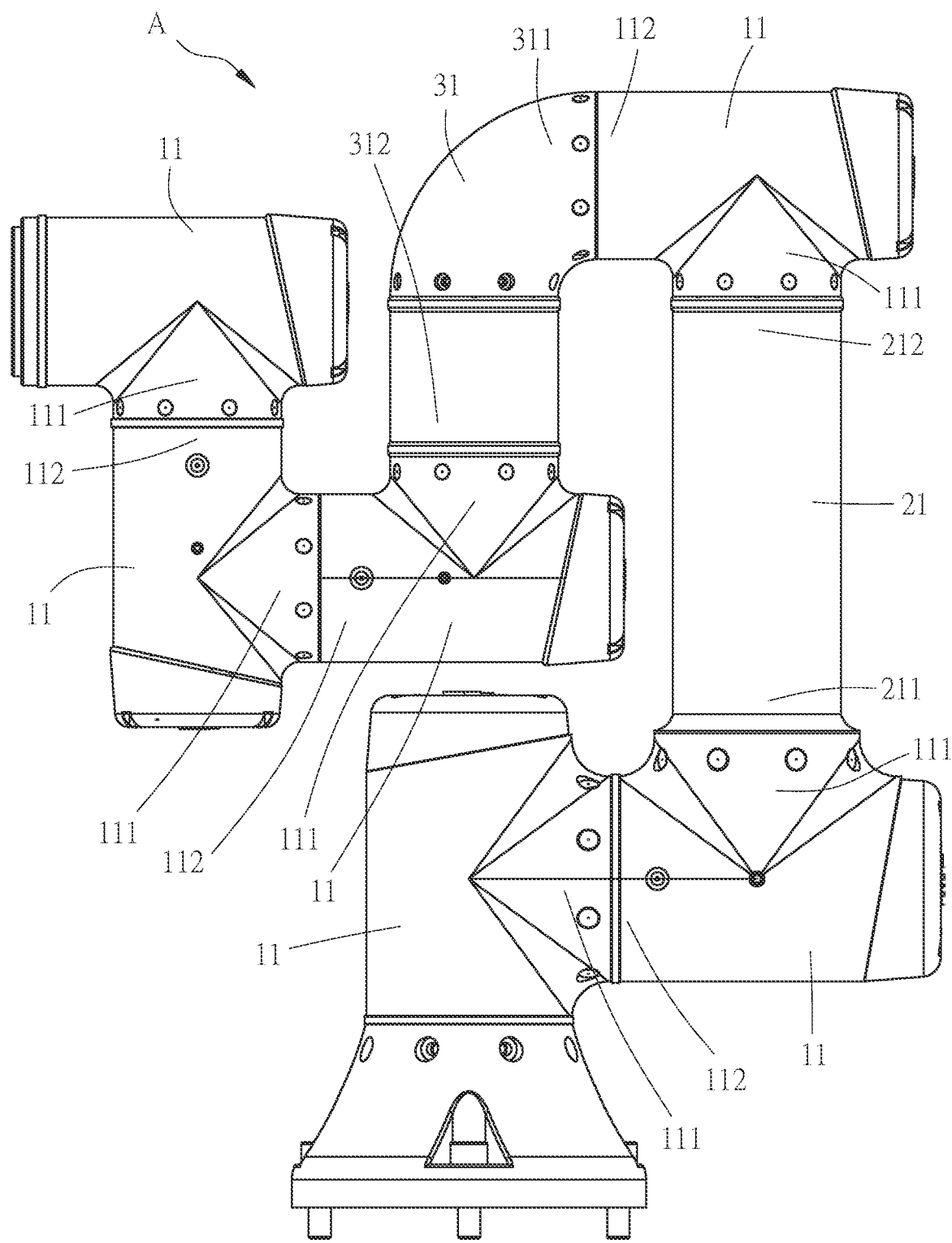
FIG. 7 is a planar view of the robot arm of the present invention.
Figure 8:
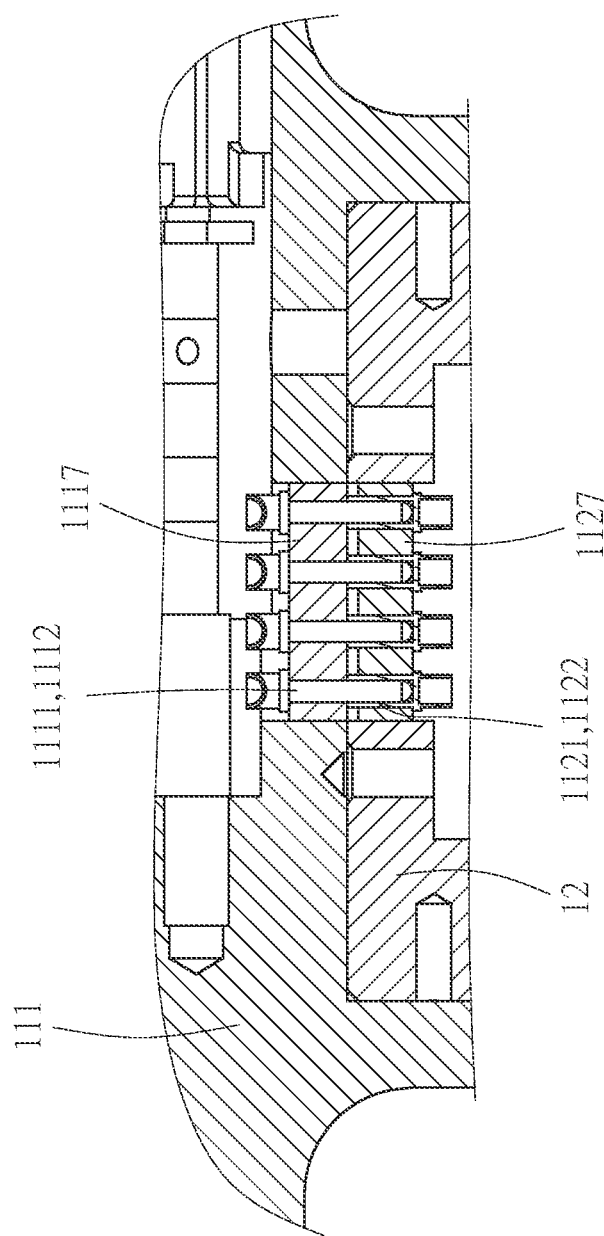
FIG. 8 is a schematic view of the present invention, illustrating the connection relationship of the contacts when the joint body and the connector body are connected to each other, wherein the fixing end of one joint body is connected to the transmission end of another joint body.
Figure 8A:
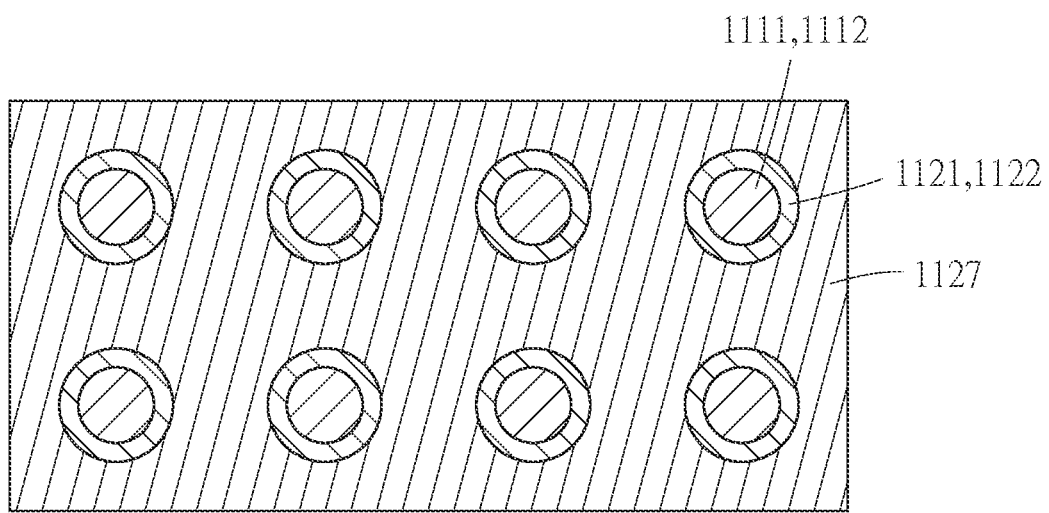
FIG. 8A is a schematic view of FIG. 8, wherein the fixing end power contact and the fixing end signal contact that are in the form of a plug pin are inserted into the transmission end power contact and the transmission end signal contact that are in the form of a socket, and the annular inner surface of the socket matches and covers the plug pin.

Referring to the foregoing figures and FIG. 7, for two adjacent joint bodies 11, the fixing end 111 of one joint body 11 is connected to the transmission end 112 of the other joint body 11. Through the fixing end coupling unit 1114 and the transmission end coupling unit 1123, the two adjacent joint bodies 11 are coupled accurately. Through a plurality of pins passing through the pin holes 1115 on the periphery of the fixing end coupling unit 1114 and the pin holes 1124 on the periphery of the transmission end coupling unit 1123, the two coupled joint bodies 11 are fixedly connected to each other. Further, the fixing end power contact 1111 and the fixing end signal contact 1112 of one joint body 11 are connected to the transmission end power contact 1121 and the transmission end signal contact 1122 of the other joint body 11, respectively. Referring to FIG. 8 and FIG. 8A, the fixing end power contact 1111 and the fixing end signal contact 1112 that are in the form of a plug pin are inserted into the transmission end power contact 1121 and the transmission end signal contact 1122 that are in the form of a socket. The annular inner surface of the socket matches and covers the plug pin. Therefore, the contacts have the largest contact area. When used to transmit signals, they have greater signal strength. When used to transmit current, they have less resistance to avoid overheating.

For adjacent joint bodies 11 and the first connector body 21, the first end 211 and the second end 212 of the first connector body 21 are connected to the fixing ends 111 of the adjacent joint bodies 11, respectively. Through the fixing end coupling unit 1114, the first end coupling unit 2114 and the second end coupling unit 2124, the adjacent joint bodies 11 and the first connector body 21 are coupled accurately. Through a plurality of pins passing through the pin holes 1115 on the periphery of the fixing end coupling unit 1114 and the pin holes 2115 on the periphery of the first end coupling unit 2114 as well as a plurality of pins passing through the pin holes 1115 on the periphery of the fixing end coupling unit 1114 and the pin holes 2125 on the periphery of the second end coupling unit 2124, the joint body 11 and the first connector body 21 that are coupled together are fixedly connected to each other. Further, the first end power contact 2111 and the first end signal contact 2112 as well as the second end power contact 2121 and the second end signal contact 2122 are connected to the fixing end power contact 1111 and the fixing end signal contact 1112 of the adjacent joint body 11, respectively. The connection of the contacts also uses a plug pin and a socket. The annular inner surface of the socket matches and covers the plug pin.

For adjacent joint bodies 11 and the second connector body 31, the first end 311 of the second connector body 31 is connected to the transmission end 112 of one adjacent joint body 11, and the second end 312 of the second connector body 31 is connected to the fixing end 111 of the other adjacent joint body 11. Through the transmission end coupling unit 1123 and the first end coupling unit 3114 as well as through the fixing end coupling unit 1114 and the second end coupling unit 3124, the adjacent joint bodies 11 and the second connector body 31 are coupled accurately. Through a plurality of pins passing through the pin holes 1124 on the periphery of the transmission end coupling unit 1123 and the pin holes 3115 on the periphery of the first end coupling unit 3114 as well as a plurality of pins passing through the pin holes 1115 on the periphery of the fixing end coupling unit 1114 and the pin holes 3125 on the periphery of the second end coupling unit 3124, the joint body 11 and the second connector body 31 that are coupled together are fixedly connected to each other. Further, the first end power contact 3111 and the first end signal contact 3112 are connected to the transmission end power contact 1121 and the transmission end signal contact 1122 of the adjacent joint body 11, respectively. The second end power contact 3121 and the second end signal contact 3122 are connected to the fixing end power contact 1111 and the fixing end signal contact 1112 of the adjacent joint body 11, respectively. The connection of the contacts also uses a plug pin and a socket. The annular inner surface of the socket matches and covers the plug pin.

Accordingly, the robot arm joint 10, the first connector 20 and the second connector 30 are assembled into the robot arm A. The joint wire assembly 14, the first connector wire assembly 22 and the second connector wire assembly 32 are connected in series with each other through the above-mentioned connection relationship. In this way, power and commands can be received for the robotic arm A to complete expected actions.

Figure 9:
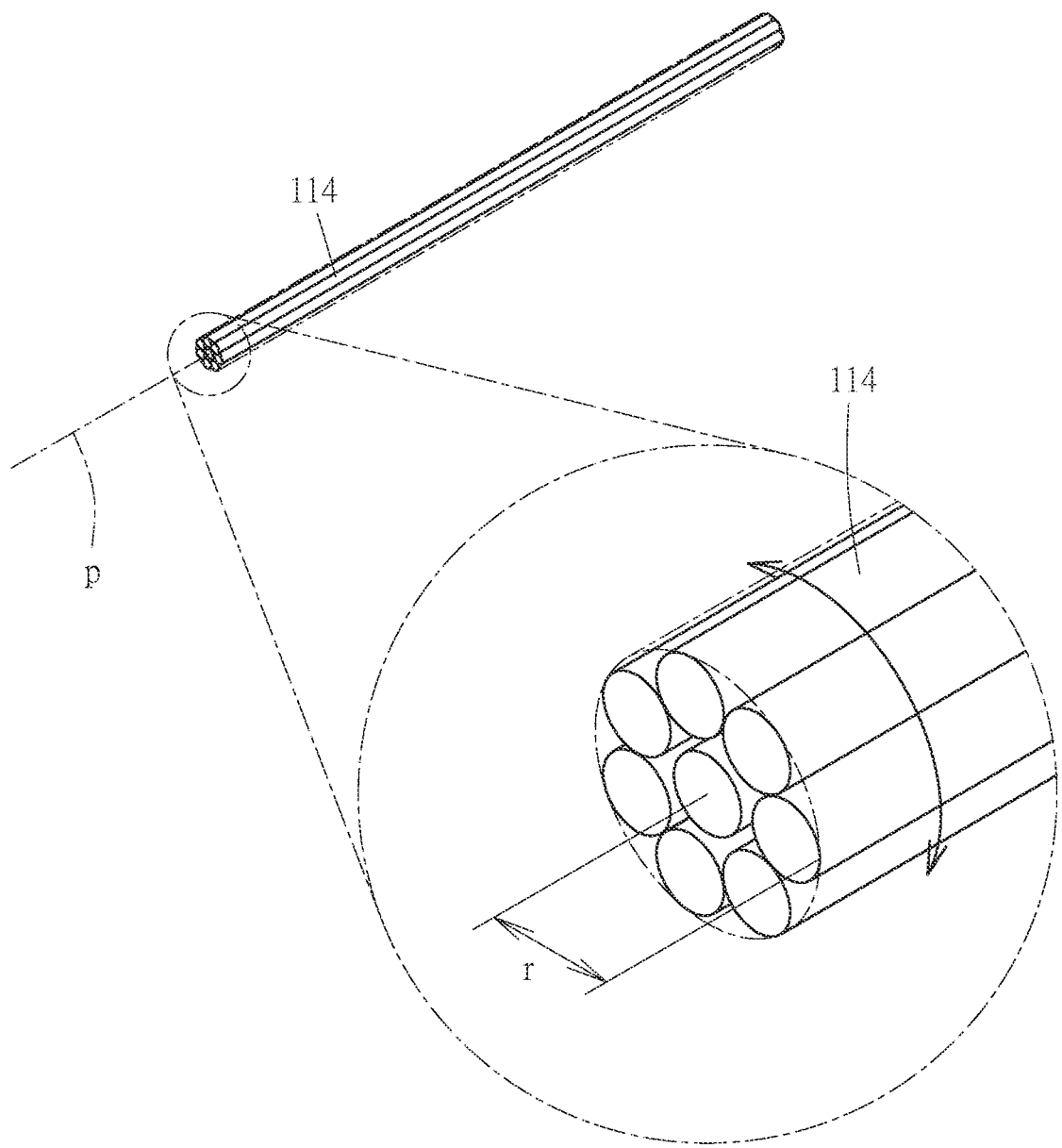
FIG. 9 is a schematic view of the present invention, illustrating the twisting of the joint wire assembly on the preset connection path when the transmission end of the joint body rotates.
Figure 10:
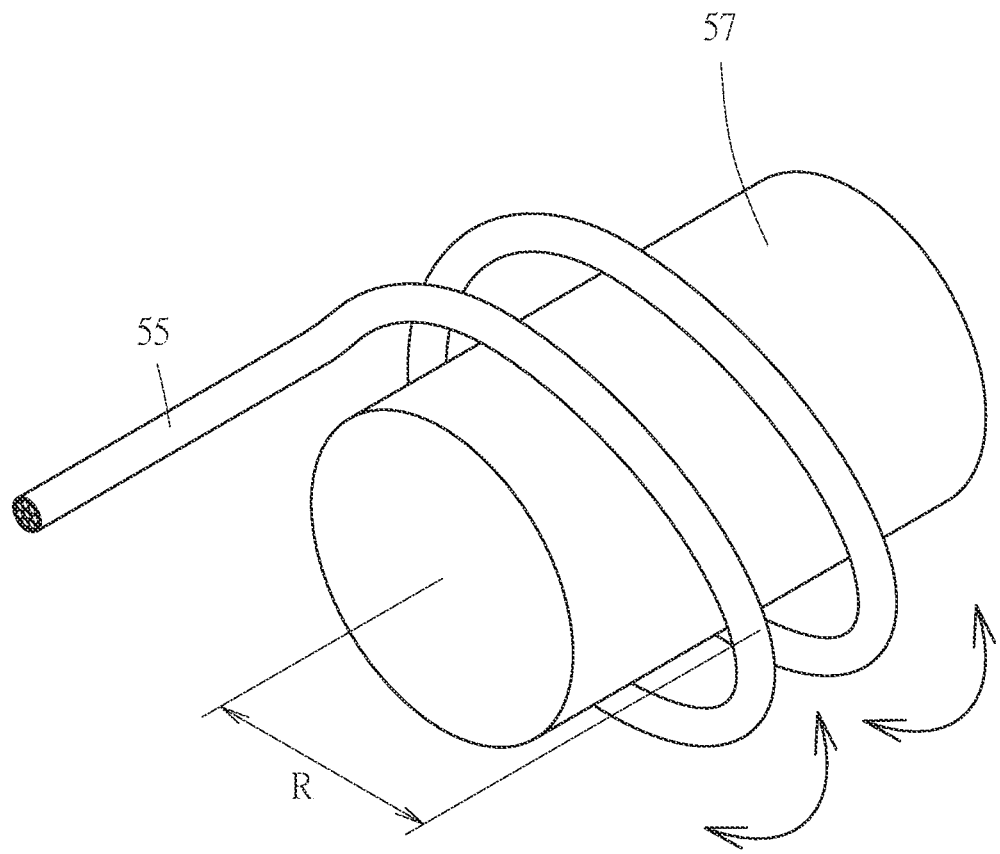
FIG. 10 is a schematic view of the prior art, illustrating that when the output shaft of a conventional robotic arm rotates, the wire harness coiled along the helical path of the output shaft is pulled or released.

Referring to FIG. 5A and FIG. 9, when power and commands are input to the robot arm A for the transmission member 12 of the transmission end 112 to rotate relative to the joint body 11, the transmission member 12 will simultaneously drive the torsion section 140 of the joint wire assembly 14 to generate a twist on the preset connection path. Specifically, the twist occurs on the straight path S on the rotation axis P of the transmission member 12, and the joint wire assembly 14 will not be coiled. Referring to FIG. 9 and FIG. 10, the torsional radius r of the torsion section 140 of the joint wire assembly 14 is much smaller than the winding radius R of the wire harness as disclosed in U.S. Pat. No. 7,206,666 (r<R). Therefore, it is applicable to the smaller joint body 11. In this embodiment, through the retaining members 17, the fixing end power contact 1111, the fixing end signal contact 1112, the transmission end power contact 1121 and the transmission end signal contact 1122 will not cause poor contact or breakage due to the stress when the transmission end 112 is rotated. If the slip ring 18 is not provided, since the torsion section 140 is substantially arranged along the straight path S, the torsion section 140 can provide enough torsion space and torsion margin for the joint wire assembly 14 to perform necessary forward rotation and reverse rotation. If the slip ring 18 is provided, the slip ring 18 allows the transmission end 112 to rotate without restriction. The rotation of the joint wire assembly 14 is completed in the slip ring 18, which will not cause other part of the joint wire assembly 14 to be twisted under force.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A robot arm joint, comprising:
   a joint body including a fixing end and a transmission end, the fixing end having a fixing end connecting surface, the transmission end having a transmission end connecting surface, wherein the fixing end of the joint body has a fixing end coupling unit, and the transmission end of the joint body has a transmission end coupling unit, wherein said fixing end coupling unit is configured with a recess portion having a substantially smooth internal surface, and said transmission end coupling unit is configured with a protruding portion having a substantially smooth external surface, said recess portion of said fixing end coupling unit receiving said protruding portion of said transmission end coupling unit with a direct contact between said substantially smooth internal and external surfaces of the recess portion of the fixing end coupling member and the protruding portion of the transmission end coupling member, respectively;
   a motor, fixed in the joint body and configured to output power to the transmission end;
   a fixing end modular contact seat, fixed to the fixing end connecting surface, the fixing end modular contact seat including a plurality of fixing end power contacts and a plurality of fixing end signal contacts; the fixing end power contacts and the fixing end signal contacts being exposed on the fixing end connecting surface;
   a transmission end modular contact seat, fixed to the transmission end connecting surface, the transmission end modular contact seat including a plurality of transmission end power contacts and a plurality of transmission end signal contacts; the transmission end power contacts and the transmission end signal contacts being exposed on the transmission end connecting surface;
   a joint wire assembly disposed in the joint body, the joint wire assembly including a plurality of joint wires extending on a preset connection path, the preset connection path including a straight path, the joint wire assembly including a torsion section and a fixed section, one end of the torsion section being connected to the transmission end modular contact seat, one end of the fixed section being connected to the fixing end modular contact seat, wherein, when the transmission end rotates, the torsion section is simultaneously driven to twist on the straight path, wherein opposite two ends of the straight path have two retaining members, a first retaining member of said two retaining members being positioned in proximity to said transmission end modular contact seat at said transmission end, and a second retaining member of said two retaining members being positioned away from said transmission end and said fixing end, wherein the joint wire assembly passes through and is retained by said two retaining members to form said torsion section and said fixed section, wherein the torsion section and fixed section are connected to each other at said second retaining member, and wherein the torsion section of the joint wire assembly extends between the first retaining member and the second retaining member, and wherein the fixed section of the joint wire assembly extends from the second retaining member to the fixing end modular contact seat at said fixing end; wherein when the transmission end rotates, the fixed section is unable to twist inside the joint body.

2. The robot arm joint as claimed in claim 1, wherein the transmission end includes a transmission member, the motor is connected to the transmission member, the transmission member is rotatable relative to the joint body, the transmission end connecting surface is located on the transmission member, and the transmission end connecting surface is exposed on the joint body.

3. The robot arm joint as claimed in claim 1, wherein the fixing end power contacts and the fixing end signal contacts are in the form of a plug pin, the transmission end power contacts and the transmission end signal contacts are in the form of a socket, and the socket has an annular inner surface matched with the plug pin.

4. The robot arm joint as claimed in claim 1, wherein the transmission end rotates about a rotation axis, the transmission end has a wire hole along the rotation axis, the straight path is arranged on the rotation axis, and the joint wire assembly passes through the wire hole and is connected to the transmission end modular contact seat.

5. The robot arm joint as claimed in claim 4, further comprising an encoder, the motor being electrically connected to the encoder, the motor and the encoder being arranged on the rotation axis sequentially in a direction opposite to the transmission end, and the straight path passes through the motor and the encoder.

6. The robot arm joint as claimed in claim 1, wherein each of the fixing end and the transmission end has a fool-proof unit.

7. A robot arm, comprising:
   at least two robot arm joints, each robot art joint being configured with:
   a joint body including a fixing end and a transmission end, the fixing end having a fixing end connecting surface, the transmission end having a transmission end connecting surface,
   a motor fixed in the joint body and configured to output power to the transmission end,
   a fixing end modular contact seat fixed to the fixing end connecting surface, the fixing end modular contact seat including a plurality of fixing end power contacts and a plurality of fixing end signal contacts; the fixing end power contacts and the fixing end signal contacts being exposed on the fixing end connecting surface,
   a transmission end modular contact seat fixed to the transmission end connecting surface, the transmission end modular contact seat including a plurality of transmission end power contacts and a plurality of transmission end signal contacts; the transmission end power contacts and the transmission end signal contacts being exposed on the transmission end connecting surface, a joint wire assembly disposed in the joint body, the joint wire assembly including a plurality of joint wires extending on a preset connection path, the preset connection path including a straight path, the joint wire assembly including a torsion section and a fixed section, one end of the torsion section being connected to the transmission end modular contact seat, one end of the fixed section being connected to the fixing end modular contact seat, wherein, when the transmission end rotates, the torsion section is simultaneously driven to twist on the straight path, wherein opposite two ends of the straight path have two retaining members, a first retaining member of said two retaining members being positioned in proximity to said transmission end modular contact seat at said transmission end, and a second retaining member of said two retaining members being positioned away from said transmission end and said fixing end, wherein the joint wire assembly passes through and is retained by said two retaining members to form said torsion section and said fixed section, wherein the torsion section and fixed section are connected to each other at said second retaining member, and wherein the torsion section of the joint wire assembly extends between the first retaining member and the second retaining member, and wherein the fixed section of the joint wire assembly extends from the second retaining member to the fixing end modular contact seat at said fixing end; and a connector for interconnecting said at least two robot arm joints, said connector including:

a connector body having a first end and a second end, the first end having a first end connecting surface and a first end modular contact seat fixed to the first end connecting surface, the first end modular contact seat including a first end power contact and a first end signal contact that are exposed on the first end connecting surface, the second end having a second end connecting surface and a second end modular contact seat fixed to the second end connecting surface, the second end modular contact seat including a second end power contact and a second end signal contact that are exposed on the second end connecting surface, wherein the first end of the connector body has a first end coupling unit, and the second end of the connector body has a second end coupling unit, wherein said first coupling unit is configured with a recess portion having a substantially smooth internal surface, and said second coupling unit is configured with a protruding portion having a substantially smooth external surface, said recess portion of said first coupling unit receiving said protruding portion of said second coupling unit with a direct contact between said substantially smooth internal and external surfaces of the recess portion of the first coupling member and the protruding portion of the second coupling member, respectively, and a connector wire assembly disposed in the connector body, the connector wire assembly including a plurality of connector wires, one end of the connector wire assembly being connected to the first end modular contact seat, another end of the connector wire assembly being connected to the second end modular contact seat.

8. The connector as claimed in claim 7, wherein the first end power contact and the first end signal contact of the first end modular contact seat are configured as a socket, the socket having an annular inner surface; and wherein the second end power contact and the second end signal contact of the second end modular contact seat are configured as a socket, the socket having an annular inner surface.

9. The connector as claimed in claim 7, wherein the first end power contact and the first end signal contact of the first end modular contact seat are in the form of a plug pin, and wherein the second end power contact and the second end signal contact of the second end modular contact seat are in the form of a socket, and wherein the socket has an annular inner surface.

10. A robot arm, comprising:
at least two robot arm joints and a connector;
wherein each of said at least two robot art joints being configured with:
a joint body including a fixing end and a transmission end, the fixing end having a fixing end connecting surface, the transmission end having a transmission end connecting surface,
a motor fixed in the joint body and configured to output power to the transmission end,
a fixing end modular contact seat fixed to the fixing end connecting surface, the fixing end modular contact seat including a plurality of fixing end power contacts and a plurality of fixing end signal contacts; the fixing end power contacts and the fixing end signal contacts being exposed on the fixing end connecting surface,
a transmission end modular contact seat fixed to the transmission end connecting surface, the transmission end modular contact seat including a plurality of transmission end power contacts and a plurality of transmission end signal contacts; the transmission end power contacts and the transmission end signal contacts being exposed on the transmission end connecting surface,
a joint wire assembly disposed in the joint body, the joint wire assembly including a plurality of joint wires extending on a preset connection path, the preset connection path including a straight path, the joint wire assembly including a torsion section and a fixed section, one end of the torsion section being connected to the transmission end modular contact seat, one end of the fixed section being connected to the fixing end modular contact seat, wherein, when the transmission end rotates, the torsion section is simultaneously driven to twist on the straight path, wherein opposite two ends of the straight path have two retaining members, a first retaining member of said two retaining members being positioned in proximity to said transmission end modular contact seat at said transmission end, and a second retaining member of said two retaining members being positioned away from said transmission end and said fixing end, wherein the joint wire assembly passes through and is retained by said two retaining members to form said torsion section and said fixed section, wherein the torsion section and fixed section are connected to each other at said second retaining member, and wherein the torsion section of the joint wire assembly extends between the first retaining member and the second retaining member, and wherein the fixed section of the joint wire assembly extends from the second retaining member to the fixing end modular contact seat at said fixing end; and wherein said connector includes:
a connector body, the connector body including a first end and a second end, the first end having a first end connecting surface and a first end modular contact seat fixed to the first end connecting surface, the first end modular contact seat including a first end power contact and a first end signal contact that are exposed on the first end connecting surface, the second end having a second end connecting surface and a second end modular contact seat fixed to the second end connecting surface, the second end modular contact seat including a second end power contact and a second end signal contact that are exposed on the second end connecting surface, wherein the first end of the connector body has a first end coupling unit, and the second end of the connector body has a second end coupling unit, wherein said first coupling unit is configured with a recess portion having a substantially smooth internal surface, and said second coupling unit is configured with a protruding portion having a substantially smooth external surface, said recess portion of said first coupling unit receiving said protruding portion of said second coupling unit with a direct contact between said substantially smooth internal and external surfaces of the recess portion of the first coupling member and the protruding portion of the second coupling member, respectively;

a connector wire assembly, disposed in the connector body, the connector wire assembly including a plurality of connector wires, one end of the connector wire assembly being connected to the first end modular contact seat, another end of the connector wire assembly being connected to the second end modular contact seat;

wherein the fixing end of the joint body of each of a first robot arm joint and a second robot arm joint of said at least two robot arm joints has a connection relationship selected from a group consisting of:

the fixing end connected to the first end, the fixing end power contacts and the fixing end signal contacts connected to the first end power contact and the first end signal contact, respectively;

the fixing end connected to the second end, the fixing end power contacts and the fixing end signal contacts connected to the second end power contact and the second end signal contact, respectively; and the fixing end of said joint body of said first robot arm joint connected to the transmission end of said joint body of said second robot arm joint, the fixing end power contacts and the fixing end signal contacts of said joint body of said first robot arm joint connected to the transmission end power contacts and the transmission end signal contacts of said joint body of said second robot arm joint, respectively;

wherein the transmission end of the joint body of each of a first robot arm joint and a second robot arm joint of said at least two robot arm joints has a connection relationship selected from a group consisting of:

the transmission end connected to the first end, the transmission end power contacts and the transmission end signal contacts connected to the first end power contact and the first end signal contact, respectively;

the transmission end connected to the second end, the transmission end power contacts and the transmission end signal contacts connected to the second end power contact and the second end signal contact, respectively; and the transmission end of said joint body of said first robot arm joint connected to the fixing end of said joint body of said second robot arm joint, the transmission end power contacts and the transmission end signal contacts of said joint body of said first robot arm joint connected to the fixing end power contacts and the fixing end signal contacts of the joint body of said second robot arm joint, respectively; and wherein the joint wire assembly and the connector wire assembly are connected in series with each other by means of the connection relationship.

11. The robot arm as claimed in claim 10, wherein the connection relationship of the first end power contact and the first end signal contact of the first end modular contact seat and the second end power contact and the second end signal contact of the second modular contact seat includes a plug pin inserted into a socket, wherein the socket has an annular inner surface matched with the plug pin.

12. The robot arm as claimed in claim 10, wherein the transmission end includes a transmission member, wherein the motor is connected to the transmission member, the transmission member is rotatable relative to the joint body, the transmission end connecting surface is located on the transmission member, and the transmission end connecting surface is exposed on the joint body.

13. The robot arm as claimed in claim 10, wherein the fixing end power contacts and the fixing end signal contacts are in the form of a plug pin, the transmission end power contacts and the transmission end signal contacts are in the form of a socket, and the socket has an annular inner surface matched with the plug pin.

14. The robot arm as claimed in claim 10, wherein a slip ring is provided in the joint body, the slip ring connects the torsion section and the fixed section, so that the torsion section is able to rotate relative to the fixed section.

15. The robot arm as claimed in claim 10, wherein the transmission end rotates about a rotation axis, the transmission end has a wire hole along the rotation axis, the straight path is arranged on the rotation axis, and the joint wire assembly passes through the wire hole and is connected to the transmission end modular contact seat.

16. The robot arm as claimed in claim 15, further comprising an encoder, the motor being electrically connected to the encoder, the motor and the encoder being arranged on the rotation axis sequentially in a direction opposite to the transmission end, and the straight path passes through the motor and the encoder.

17. The robot arm as claimed in claim 10, wherein the first end coupling unit is a fixing end coupling unit, wherein the second end coupling unit is a transmission end coupling unit, and wherein each of the fixing end and the transmission end has a fool-proof unit coupled to the fixing end and transmission end coupling unit, respectively.

\* \* \* \* \*